Dec. 6, 1949     T. R. WELCH     2,490,182

MULTIELECTRODE GAS DISCHARGE ELECTRIC SIGN

Filed Dec. 28, 1945

*INVENTOR.*
THOMAS ROSS WELCH

BY

*ATTORNEY*

Patented Dec. 6, 1949

2,490,182

UNITED STATES PATENT OFFICE 2,490,182

MULTIELECTRODE GAS DISCHARGE ELECTRIC SIGN

Thomas Ross Welch, Los Angeles, Calif.

Application December 28, 1945, Serial No. 637,711

3 Claims. (Cl. 177—346)

My invention relates to electric signs of the type having glow tubes, such as neon tubes arranged so that by the selected illumination thereof different characters or letters will be displayed, this end was the object of my earlier invention that issued into Patent Number 2,290,261, July 21, 1942, and the present invention relates in particular to a simple means for supporting and controlling the energization of the glow tube.

In signs of this type gas filled tubes are employed. In the present invention these tubes, which are made of glass, are provided with rearwardly extended portions, referred to herein as legs, which legs are projected into or through openings in a support such as a vertical panel. The tubes are supported on the front face of the panel and control switches are mounted on the rear face of the panel in close proximity to the electrodes carried within the legs of the glow tubes.

It is an object of the invention to provide a sign device of the above character wherein the glow tubes are mounted on the front face of the panel and the control switches are mounted on the rear face of the panel on lines extending between cooperating pairs of electrodes.

It is a further object of the invention to provide a panel having a plurality of electromagnetically operated control switches mounted on the rear face thereof, with a plurality of letter formers secured to the front face of the panel, such letter formers comprising glow tubes having cooperating electrodes which are connected to the control switches.

A further object of the invention is to provide a simple form of magnetically operated relay or control switch which may be conveniently secured to the rear face of a panel and has terminals for connection to the high voltage conductors which in turn are connected to the electrodes of the glow tube, this control switch having exposed terminals spaced widely apart so that the danger of the high voltage current jumping from one terminal to another is minimized.

It is a further object to provide a simple sign unit wherein the tubes are mounted on the front face of the panel and have rearwardly faced electrodes, with control relay switches secured to the back of the panel, in such positions that each switch will be disposed between the two electrodes of the glow tube arrangement which the switch serves, such relay switch having a relatively slender body with means for supporting it in a position projecting normal to the inner face of the panel, thereby making it possible to place the switches between electrodes which are spaced relatively close together due to the reduced length of the glow tube sections which the electrodes serve.

A further object of the invention is to provide a relay switch including a hollow body of insulating material, such body being preferably of a form of a cylindrical or tubular shell, having a dividing wall intermediate its ends so as to form within the shell a pair of isolated chambers, one of which chambers contains an electromagnet with the poles thereof in close proximity to the dividing wall, and the other chamber contains a switch which is arranged to be actuated by an armature placed adjacent the other face of the dividing wall and in such position that energization of the electromagnet will cause movement of the armature whereby to actuate the switch.

It is a further object of the invention to provide an electromagnetic relay or control switch having a shell of insulating material, such as one of the molded insulating compounds, this shell providing an opening in which the electromagnet may be sealed in such position that the pole pieces thereof may lie adjacent to or in contact with a wall of insulating material, and means for supporting an armature actuated switch on the opposite side of the wall from the electromagnet, together with means for covering the armature actuated switch and at the same time permitting ready attachment of conductors to the parts of the switch.

A further object of the invention is to provide a simple form of magnetically operated relay or control switch which may be secured to the rear face of a panel and has terminals for connection to the high voltage conductors which in turn are connected to the electrodes of the glow tubes, this control switch having widely spaced exposed terminals and a safety means comprising a bowed spring element having one end fixed to one of said terminals and its free end held in contact with said terminal by a fuse means and adapted to move into control with the opposite terminal when said fuse means is melted because of an excessive high voltage current through said terminals.

Further objects and advantages of the invention will be brought out in the following part of the specification.

Referring to the drawing which is for illustrative purposes only,

Fig. 1 is a vertically sectioned side view of a portion of a sign device according to my present invention.

Fig. 2 is an enlarged longitudinal sectional view of one of the control switches 25 shown in Fig. 1.

Fig. 3 is a view of the right end of Fig. 2, with the cover member removed.

In Fig. 1 I show a panel 11 with a glow tube means 12 supported by insulator 12a, of well known construction, adjacent the front face 13 of the panel, this glow tube 12 having rearwardly extending tubular legs 14 which project toward the panel and preferably extend through openings 15 in the panel. The panel 11 may be made of any suitable material. Whether it is to be made of an insulating material or of a non-insulating material such as sheet metal, will of course depend upon how close the terminals 16 for the electrodes 17 are to the face of the panel. In Fig. 1 I show the legs 14 as being of such length that they will project entirely through the openings 15 and support the terminals 16 at a distance from the rear face 18 of the panel 11.

The electrodes 17 divide the glow tube 12 into a plurality of sections 20a, 20b, 20c, and 20d. From a suitable source of electrical energy, such as a transformer 21, conductors 22 and 23 are connected to the end terminals 16 of the glow tube 12 so that when a switch 24, associated with the conductors 22' and 23' connecting the source of electrical energy to the transformer 21, is closed, all of the sections 20 of the glow tube 12 may be energized in series. Control switches 25, specifically indicated as 25a, 25b, 25c, and 25d, are secured to the rear face of the panel 11 essentially aligned with the sections 20a, to 20d, respectively. The electrodes 17 are specifically identified as 17a, 17b, 17c, 17d, and 17e, and the control switches 25 are respectively connected to these electrodes, through the associated terminals 16, so that the sections 20 may be selectively bridged or shorted out of the series circuit formed in part by the conductors 22 and 23. For example, the control switch 25a is connected through conductors 30 and 31 with the electrode 17a and 17b of the section 20a. If the control switch 25a is closed, the section 20a will be bridged so that current from the conductor 23 may flow directly from the upper terminal 16 through the conductors 30 and 31 to the terminal associated with the electrode 17b, and if the switches 25b, 25c, and 25d are at this time open, the energizing current or potential will flow through the sections 20b, 20c, and 20d to the electrode 17e, which has connection through a terminal 16 with the conductor 22. Accordingly, by suitable actuation of the control switches 25 selected sections 20 of the glow tube 12 may be bridged or shorted out of the circuit so that such sections will remain dark while the remaining non-bridged section 20 will be illuminated upon closing of the switch 24.

In the preferred practice of the invention I employ control switches 25 which are of relatively slender form so that they may be secured in rearwardly extending position on the rear face 18 of the panel 11 and between adjacent openings 15. As shown in Fig. 2, the control switch 25a, comprises a shell having a tubular wall 32 of insulating material supporting a transverse wall 33 preferably disposed intermediate the ends of the wall 32 so that two chambers 34 and 35 are formed in the shell. The shell may be molded from a suitable insulating material such as Bakelite, and the outer end of the wall 32 may be provided with a radial flange 36.

The inner chamber 34, which is shown as having greater axial length than the other chamber 35, receives an electromagnet 37 comprising a core 38 with end pieces 39 and 40 forming a spool to carry a winding 41. To the rear end of the core 38 a flat metal field piece 43 is secured, this field piece 43 being bent so as to lie along one side of the electromagnet and provide a magnetic pole 44 adjacent pole 45 formed by the front end of the core 38. The electromagnet 37 may be secured in the rear chamber 34 by means of a screw 46 which passes through a bracket 47, through an opening in the wall 32, and threads into the field piece 43. The electromagnet 37 may be sealed in the chamber 34 by pouring a body or wall 46' of pitch material or compound into the rear end of the chamber 34 so as to cover the rear end of the electromagnet 37, substantially as shown in Fig. 2. The poles 44 and 45 of the electromagnet 37 preferably rest in depressions 47' in the transverse wall 33 facing the chamber 34.

The outer or front chamber 35 contains a magnetically actuated switch 48 including an armature 49 which may be a rectangular piece of flat soft iron disposed in spaced relation to the wall 33, and in such position that when the electromagnet 37 is energized, the magnetic flux will attract the armature 49 toward the poles 44 and 45. The armature 49 is supported by a resilient member 51 preferably made from a flat strip of hard brass or bronze bent to Z-shaped form so that its inner end 53 may be secured as by means of rivets 54 to one end of the armature 49 and the outer end 55 thereof will lie across the outer face of the flange 36. The end of the armature 49 opposite the supporting member 51 may be provided with a contact 56 adapted to engage the inner end 57 of a contact member 58 formed from a flat strip of metal to such shape that the outer portion 59 thereof will lie across the outer face of the flange 36 in a position substantially diametrically opposite the outer portion 55 of the member 51.

As shown in Fig. 2, the supporting member 51 normally holds the armature 49 in such position that the contact 56 will be held with pressure against the inner end 57 of the member 58. When the electromagnet 34 is energized, the armature 49 will be moved to carry the contact 56 out of engagement with the end 57. Actuation of the switch 48 may be considered either the closing movement or the opening movement thereof, or both as may be desired. For example, the switch may be held magnetically in open condition, and it may be actuated by discontinuance of the magnetic force of the electromagnet 37 to release the armature 49 so as to close the switch 48. In Fig. 1 I show a source of electric current in the form of a battery 61 from which a conductor 62 extends for connection to each of the electromagnets 37 of the control switches 25. This conductor 62 may be connected to each of the leads 63 from the electromagnets. Separate conductors 64 specifically identified as 64a, 64b, 64c, and 64d, are connected through switches a, b, c, d, with the battery 61. These conductors 64 are respectively connected to the remaining leads 65 of the electromagnets 37, shown in Fig. 2, so that by selective closing and opening of the switches a, b, c, d, the electromagnets 37 may be energized or deenergized in accordance with a selected plan of bridging and unbridging the glow tube sections 20a, 20b, 20c, and 20d.

Each one of the control switches 25 is provided with a safety device for closing the circuit through the magnetically actuated switches 48 if the contacts of any of the switches are burned out resulting from an excessive current temporarily passing through the leads 30 and 31, which would short out the circuit so that the section of the glow tube 12 controlled thereby would remain dark. This safety device, as shown in Fig. 2, comprises a spring member 80 having one end connected to the contact member 58 and then bowed with its free end 81 held in place in a recess 82 provided in the contact member 58 by a fuse element 83. If the contacts 56 and 57 are burned out by excessive current temporarily passing through the leads 30 and 31, the fuse element 83 will melt, permitting the free end 81 of the spring member 80 to move into engagement with the contact 51 to bridge the section between the burned out contacts 51 and 58, thus closing the series circuit through the control switch 25 to restore the switch 25 to an operative condition.

Screw means 66 are provided for securing the members 51 and 58 in the positions thereof shown in Figs. 2 and 3. These screw means each has a head or nut 67 intermediate the ends thereof to respectively bear against the outer portions 55 and 59 of the members 51 and 58 when nuts 68 are applied to the ends of the screw means which are projected through openings in the flange 36. The outer portions 69 of the screw means 66 serve in conjunction with nuts 70 to secure a cover 71 against the outer face of the flange 36 so as to close and seal the switch chamber 35. The cover 71 has openings 72 through which the outer portion 69 of the screw means 66 pass, and the cover 71 may have a cylindrical lip 73 to extend around the edge face of the flange 36.

I claim as my invention:

1. In an illuminable sign of the character described, the combination of: a supporting panel; a glow tube means mounted on the front face of said panel, said glow tube means having spaced electrodes dividing said glow tube means into sections; legs on said glow tube means embodying said electrodes and extending through said panel to place the terminals of said electrodes in spaced relation to the rear face of said panel, means connecting said electrodes in series in an energized circuit; control switches mounted on the rear face of said panel, each of said switches being connected to the electrodes at the ends of a section of said glow tube means, each of said switches having an electromagnet for its operation operated by low voltage means; and control circuits connected to said electromagnets of said switches whereby said switches may be actuated and selected sections of said glow tube means bridged.

2. In an illuminable sign of the character described, the combination of: a supporting panel having openings therein; glow tube means having rearwardly extending legs dividing the same into sections, said legs having electrodes therein; means for mounting said glow tube means on the front face of said panel with its extended legs projecting through said openings in said panel to place the terminals of said electrodes in spaced relation to the rear face of said panel; means for connecting said electrodes in series with a high voltage energizing circuit, control switches mounted on the rear face of said panel adjacent to respective pairs of said electrodes, each of said switches having an electromagnet for its operation; means for connecting each of said control switches to said pair of electrodes defining a section of said glow tube means; and low voltage control circuits connected to said electromagnets of said control switches whereby said control switches may be actuated and selected sections of said glow tube means bridged.

3. In an illuminable sign of the character described, the combination of; glow tube means having rearwardly extending legs dividing the same into sections; said legs having electrodes therein; means for mounting said glow tube means on the front face of said panel with its extended legs projecting through said openings in panel to place the terminals of said electrodes in spaced relation to the rear face of said panel means for connecting said electrodes in series with an energizing circuit; control switches, each having an electromagnet for its operation, mounted on the rear face of said panel, each switch positioned substantially between a pair of electrodes defining the section of said glow tube means it operates; and control circuits connected to the electromagnets of said control switches whereby said control switches may be actuated and selected sections of said glow tube means bridged.

THOMAS ROSS WELCH.

REFERENCES CITED

The following references are of record in the file of this patent:

UNITED STATES PATENTS

| Number | Name | Date |
| --- | --- | --- |
| 1,920,135 | Allen | July 25, 1933 |
| 1,965,206 | Tarbox | July 3, 1934 |
| 2,087,674 | Nelson et al. | July 20, 1935 |
| 2,290,261 | Welch | July 21, 1942 |
| 2,295,869 | Seaman | Sept. 15, 1942 |

Certificate of Correction

Patent No. 2,490,182 December 6, 1949

THOMAS ROSS WELCH

It is hereby certified that errors appear in the printed specification of the above numbered patent requiring correction as follows:

Column 3, line 6, for the word "insulator" read *insulators*; line 42, for "electrode" read *electrodes*; column 6, line 53, list of references cited, for "July 20, 1935" read *July 20, 1937*;

and that the said Letters Patent should be read with these corrections therein that the same may conform to the record of the case in the Patent Office.

Signed and sealed this 11th day of April, A. D. 1950.

[SEAL]

THOMAS F. MURPHY,
*Assistant Commissioner of Patents.*